US012725480B2

United States Patent

(12) United States Patent
Frankenberger et al.

(10) Patent No.: US 12,725,480 B2
(45) Date of Patent: Sep. 1, 2026

(54) SENSOR AND METHOD FOR CHECKING DOCUMENTS OF VALUE, SENSOR SYSTEM AND DOCUMENT OF VALUE PROCESSING DEVICE

(71) Applicant: GIESECKE+DEVRIENT CURRENCY TECHNOLOGY GMBH, Munich (DE)

(72) Inventors: Jorg Frankenberger, Markt Schwaben (DE); David Sacquard, Munich (DE); Klaus Thierauf, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 81 days.

(21) Appl. No.: 18/718,893

(22) PCT Filed: Nov. 30, 2022

(86) PCT No.: PCT/EP2022/025540

§ 371 (c)(1),
(2) Date: Jun. 12, 2024

(87) PCT Pub. No.: WO2023/110143

PCT Pub. Date: Jun. 22, 2023

(65) Prior Publication Data

US 2025/0069461 A1 Feb. 27, 2025

(30) Foreign Application Priority Data

Dec. 14, 2021 (DE) ..................... 10 2021 006 158.6

(51) Int. Cl.
*G07D 7/1205* (2016.01)

(52) U.S. Cl.
CPC ....... *G07D 7/1205* (2017.05); *G07D 2207/00* (2013.01)

(58) Field of Classification Search
CPC ... G07D 7/1205; G07D 2207/00; G07D 7/121
(Continued)

(56) References Cited

U.S. PATENT DOCUMENTS 11,756,362 B2 9/2023 Deckenbach et al.
2003/0031342 A1 2/2003 Sperl et al.
(Continued)

FOREIGN PATENT DOCUMENTS

DE 10137043 A1 2/2003
DE 102008064389 A1 6/2010
(Continued)

OTHER PUBLICATIONS

German Search Report from corresponding DE Application No. 102021006158.6, Aug. 12, 2022.
(Continued)

*Primary Examiner* — Md M Rahman
(74) *Attorney, Agent, or Firm* — Workman Nydegger

(57) ABSTRACT

A sensor and a method for checking documents of value are provided with a radiation source for applying electromagnetic radiation to a document of value and a detector for position-resolved recording of the electromagnetic radiation emerging from the document of value in at least two different spectral ranges. A first feature of the document of value is checked with the aid of the detector signals generated for at least one first spectral range, and a second feature is checked while taking into account the detector signals generated for at least one second spectral range. The electromagnetic radiation recorded by the detector, or the detector signals of the detector, are attenuated color channel-specifically, an attenuation being performed in the first spectral range relative to the second spectral range. A sensor system and a document of value processing device are provided employing the sensor and/or method.

19 Claims, 3 Drawing Sheets

(58) Field of Classification Search
USPC .......................................................... 356/71
See application file for complete search history.

(56) References Cited

U.S. PATENT DOCUMENTS

| | | | | |
|---|---|---|---|---|
| 2010/0128964 | A1 | 5/2010 | Blair | |
| 2014/0253705 | A1 * | 9/2014 | Kummailil ............. | H04N 23/88 348/68 |
| 2020/0111277 | A1 | 4/2020 | Clark | |

FOREIGN PATENT DOCUMENTS

| | | | | | |
|---|---|---|---|---|---|
| DE | 102011005518 | A1 | * | 9/2012 | ............. G07D 7/121 |
| DE | 102018004884 | A1 | | 12/2019 | |
| KR | 20190107024 | A | * | 9/2019 | ............... G07D 7/12 |

OTHER PUBLICATIONS

International Search Report from corresponding PCT Application No. PCT/EP2022/025540, Apr. 25, 2023.

* cited by examiner

SENSOR AND METHOD FOR CHECKING DOCUMENTS OF VALUE, SENSOR SYSTEM AND DOCUMENT OF VALUE PROCESSING DEVICE

BACKGROUND

The invention relates to a sensor and a method for checking documents of value, in particular bank bills, to a sensor system and to a document of value processing device.

For protection against forgery, documents of value, in particular bank bills, are provided with so-called security or authenticity features. Depending on the type and configuration, the features present on a document of value may vary sometimes greatly in respect of their optical properties. For example, a document of value may be provided with a printed window having a high transmittance for electromagnetic radiation and at the same time with a microperforation having a significantly lower transmittance for electromagnetic radiation. During the automatic checking of such documents of value, it may therefore occur that the electromagnetic radiation striking various features of a document of value is very differently remitted, transmitted and/or absorbed or the features exhibit a very different luminescence, so that, depending on the feature, too little or too much radiation may strike a detector intended to record the radiation emerging from the document of value, as a result of which the corresponding detector signal is sometimes too low and is swamped by the noise, or the detector is overloaded. In such cases, reliable checking of the features cannot be ensured.

SUMMARY

It is an object of the invention to provide a sensor, a method, a sensor system and a document of value processing device for checking documents of value provided with different features as reliably as possible.

A sensor for checking documents of value, in particular bank bills, according to a first aspect of the present disclosure has: at least one radiation source which is adapted to apply electromagnetic radiation to a document of value, and a detector which is adapted to record electromagnetic radiation emerging (for example transmitted, remitted or emitted) from the document of value in at least two different spectral ranges (so-called color channels) with position resolution (pixel by pixel), while generating for each of the spectral ranges (color channels) a (position-resolved) detector signal corresponding to the intensity of the recorded electromagnetic radiation in the respective spectral range, in particular acquiring for each of the spectral ranges (color channels) an image or partial image of the document of value, for example a transmission image or partial transmission image or a remission image or partial remission image or a luminescence image or partial luminescence image. The at least two different spectral ranges comprise a first spectral range and a second spectral range different to the first spectral range, and optionally one or more further spectral ranges different thereto.

Aspects of the present disclosure are based on the approach of setting up or carrying out a color channel-specific attenuation in the first spectral range relative to the second spectral range in the sensor. The color channel-specific attenuation may, for example, be

- a color channel-specific attenuation of the electromagnetic radiation of the first spectral range shined onto the document of value relative to the electromagnetic radiation of the second spectral range shined onto the document of value and/or
- a color channel-specific attenuation of the electromagnetic radiation of the first spectral range to be recorded by the detector relative to the electromagnetic radiation of the second spectral range to be recorded by the detector and/or
- a color channel-specific attenuation for the (position-resolved) detector signals of the first spectral range relative to the (position-resolved) detector signals of the second spectral range.

Preferably, the color channel-specific attenuation within the respective document of value is constant as a function of time during the checking of the respective document of value, i.e. during the recording of the electromagnetic radiation emerging from the respective document of value. Dynamic attenuation of the first spectral range relative to the second spectral range is therefore not necessary during the recording of the electromagnetic radiation emerging from the document of value (less measurement outlay).

Preferentially, the color channel-specific attenuation of the intensity in the first spectral range, or the detector signals of the first spectral range, relative to the intensity in the second spectral range, or relative to the detector signals of the second spectral range, is at least a factor of 5, particularly preferentially at least a factor of 10.

The color channel-specific attenuation may be carried out on the detector side and/or illumination side. In particular, the color channel-specific attenuation may be set up (on the detector side) by a color channel-specific filter and/or by a color channel-specific (color channel-selective) amplifier. Alternatively or in addition, the color channel-specific attenuation may be set up (on the illumination side) by a color channel-specific filter and/or by a color channel-specific (spectrally selective) attenuation of the radiation source(s).

The sensor has an evaluation instrument, which is adapted to check a first feature provided on or in the document of value, in particular an authenticity or security feature, (only) with the aid of the detector signals generated for the at least one first spectral range, and to check a second feature (different from the first feature) provided on or in the document of value, in particular an authenticity or security feature, while taking into account the detector signals generated for the at least one second spectral range.

In particular, the evaluation instrument may be adapted to check the first feature (only) with the aid of the detector signals generated for the at least one first spectral range, without taking into account the detector signals generated for the at least one second spectral range. The evaluation instrument may also be adapted to check the second feature (only) with the aid of the detector signals generated for the at least one second spectral range, without taking into account the detector signals generated for the at least one first spectral range, or while taking into account the detector signals generated for the at least one first spectral range and for the at least one second spectral range (for example in order to obtain higher detection signals for the second feature). The first and second features are spatially offset from one another, in particular not overlapping one another, on or in the respective document of value.

For the color channel-specific attenuation, the sensor may have at least one color channel-specific filter which is/are arranged between the detector and the document of value and/or between the radiation source and the document of value, and which is/are adapted to attenuate the electromagnetic radiation that emerges from the document of value or is applied to the document of value in the first spectral range relative to the second spectral range, preferentially by at least a factor of 5, particularly preferentially at least by a factor of 10. The color channel-specific filter has the advantage that the color channel-specific attenuation is then achieved without (elaborate) color channel-specific correction, or amplification, of the detector signals.

Alternatively or in addition, the sensor may have at least one amplifier for the color channel-specific attenuation, which is adapted to amplify the detector signals generated for the different spectral ranges, the amplification of the (position-resolved) detector signals generated for the first spectral range being less, preferentially by at least a factor of 5, particularly preferentially by at least a factor of 10, than the amplification of the (position-resolved) detector signals generated for the second spectral range.

The radiation source(s) may be suitable for applying electromagnetic radiation (in particular simultaneously) of the first and second spectral ranges, and optionally further spectral ranges (for example white light that contains the first and second spectral ranges), to the document of value. This is the case, for example, when the sensor performs a remission or transmission check of the first and second features. For example, an LED row arranged perpendicularly to the transport direction of the document of value, which has—respectively distributed over the LED row—both LEDs for the first spectral range and LEDs for the second spectral range, is used as radiation sources.

Preferably, the first and second spectral ranges lie in the visible spectral range. This has the advantage that the spectral range in which the first and second features are checked by the sensor then spectrally lies precisely where a human observer would also check the first and second features, namely in the optically visible spectral range. Especially for first and second features that have been developed in order to be checked by eye, the result of the machine checking by the sensor is then more comparable with the result of checking by eye.

A color channel-specific attenuation of the radiation source(s) may then be carried out for the color channel-specific attenuation, in which the radiation source(s) is/are operated in particular so that its/their emission intensity in the at least one first spectral range is less, preferably by at least a factor of 5, particularly preferentially by at least a factor of 10, than in the at least one second spectral range. The color channel-specific attenuation of the radiation source(s) also has the advantage that the color channel-specific attenuation is then achieved without (elaborate) color channel-specific correction, or amplification, of the detector signals. The radiation sources are, for example, a plurality of spectrally different LEDs for the first and second spectral ranges, which are conventionally operated so that their emission intensity is comparable in value, i.e. differs at most by a factor of 2. They are for example red, blue and green LEDs, which are operated simultaneously in order to generate white light.

A sensor system according to a second aspect of the present disclosure has a sensor according to the first aspect and a document of value, in particular a bank bill, which has: at least one first feature, in particular an authenticity or security feature, which is adapted to deliver, in particular transmit, remit and/or emit, electromagnetic radiation, and at least one second feature, in particular an authenticity or security feature, which is adapted to deliver, in particular transmit, remit and/or emit, electromagnetic radiation, the first feature having a higher remission or transmission and/or lower absorption for the electromagnetic radiation that is applied to the document of value than the second feature has, the difference in the remission/transmission/absorption for the electromagnetic radiation of the first and second spectral ranges being in particular at least a factor of 5, for example at least a factor of 10.

For example, the first authenticity or security feature is a (substantially transparent) window which is integrated into the document of value and is covered with a film. The film may be structureless or uniformly transparent in the region of the window, or it may have one or more motifs, symbols or alphanumeric characters there. In particular, the second authenticity or security feature is a microperforation of the document of value, which has a multiplicity of small holes and/or transparent locations in the document of value, in particular each with a diameter of less than 1 mm, which together form for example one or more motifs, symbols or alphanumeric characters.

A document of value processing device according to a third aspect of the present disclosure has: a sensor according to the first aspect or a sensor system according to the second aspect, and a transport instrument which is adapted to convey documents of value, in particular relative to the sensor.

In a method for checking documents of value, in particular bank bills, according to a fourth aspect of the present disclosure, electromagnetic radiation is generated by at least one radiation source and is applied to a document of value, and electromagnetic radiation emerging from the document of value is recorded in at least two different spectral ranges/color channels with position resolution (pixels) by a detector, which has a multiplicity of detector elements arranged at different locations, while generating for each of the spectral ranges a (position-resolved) detector signal corresponding to the intensity of the recorded electromagnetic radiation in the respective spectral range, in particular acquiring for each of the spectral ranges an image or partial image of the document of value. The (aforementioned) first (authenticity or security) feature provided on or in the document of value is checked (only) with the aid of the detector signals generated for at least one first spectral range (of the aforementioned spectral ranges). The (aforementioned) second (authenticity or security) feature provided on or in the document of value is checked while taking into account the detector signals generated for at least one second spectral range (of the aforementioned spectral ranges).

A color channel-specific attenuation is set up in the first spectral range relative to the second spectral range, in particular a color channel-specific attenuation of the electromagnetic radiation of the first spectral range shined onto the document of value relative to the electromagnetic radiation of the second spectral range shined onto the document of value, and/or a color channel-specific attenuation of the electromagnetic radiation of the first spectral range to be recorded by the detector relative to the electromagnetic radiation of the second spectral range to be recorded by the detector, and/or a color channel-specific attenuation for the detector signals of the first spectral range relative to the detector signals of the second spectral range.

In particular, the electromagnetic radiation that emerges from the document of value or is applied to the document of value may be attenuated in the first spectral range relative to the second spectral range by means of at least one filter arranged between the detector and the document of value and/or between the radiation source and the document of value, or the (position-resolved) detector signals generated for the different spectral ranges are amplified by means of an amplifier, the amplification of the detector signals generated for the first spectral range being less than the amplification of the detector signals generated for the second spectral range, or a color channel-specific attenuation of the radiation source(s) suitable for emission in the first and second spectral ranges is carried out, in which the radiation source (s) is/are operated in particular so that its/their intensity in the at least one first spectral range is less, preferably by at least a factor of 5, than in the at least one second spectral range.

Unless otherwise indicated, the terms "spectral range", "spectral channel" and "color channel" are used synonymously in the context of the present disclosure.

The color channel-specific attenuation may be carried out on the detector side by the electromagnetic radiation emerging from the document of value being attenuated in at least one first color channel in relation to at least one second color channel, in particular by at least a factor of 5, preferentially by at least a factor of 10, by means of at least one filter arranged at or before the detector, for example a so-called RGB detector with color channels in the red, green and blue spectral ranges. The filter may in this case be configured as a so-called spectral filter which attenuates, in particular absorbs, the electromagnetic radiation in the at least one first color channel or spectral range more strongly than in the at least one second color channel or spectral range. Alternatively or in addition, the filter may however also be configured as a so-called neutral density filter, in which spectrally non-selective or spectrally homogeneous filter elements are arranged before detector pixels that are assigned to at least one first color channel, by which the electromagnetic radiation striking the detector pixels of the at least one first color channel are attenuated in relation to other detector pixels that are assigned to at least one second color channel. Alternatively or in addition, detector signals obtained for the different color channels may be amplified by different amounts, the amplification of the detector signals obtained for at least one first color channel being less, in particular by at least a factor of 5, preferentially by at least a factor of 10, than the amplification of the detector signals obtained for at least one second color channel.

The color channel-specific attenuation may, however, also be carried out on the illumination side by the radiation source for irradiating the document of value generating electromagnetic radiation whose intensity in at least one first color channel is less than in at least one second color channel, in particular by at least a factor of 5, preferentially by at least a factor of 10. For example, the radiation source may have two or more light sources, for example in the form of LEDs, which respectively emit light in the different color channels, or spectral ranges, the light emitted in at least one first color channel or spectral range having a lower intensity, in particular by at least a factor of 5, preferentially by at least a factor of, than the light emitted in at least one second color channel or spectral range. Alternatively or in addition, a filter, in particular a spectral filter, which attenuates the electromagnetic radiation generated by the radiation source in at least one first color channel in relation to at least one second color channel, in particular by at least a factor of 5, preferentially by at least a factor of 10, may be provided between the radiation source (which emits for example white light) and the document of value.

The above-described color channel-specific attenuation (on the detector side or on the illumination side) achieves the effect that the electromagnetic radiation that is to be recorded, or is recorded, by the detector in the at least one first color channel has a lower intensity than in the at least one second color channel. For the at least one first color channel, the detector therefore generally delivers usable detector signals, in particular without being overloaded, even when the intensity of the electromagnetic radiation emerging from the document of value is relatively high, for example in the case of a transmission measurement with bright field illumination of a printed window provided in the document of value. Conversely, the electromagnetic radiation that is to be recorded, or is recorded, by the detector in the at least one second color channel has a higher intensity than in the at least one first color channel, so that the detector generally delivers usable detector signals for the at least one second color channel with a sufficient amplitude, or above a particular signal-to-noise ratio, even when the intensity of the electromagnetic radiation emerging from the document of value is relatively low, for example in the case of a transmission measurement with bright field illumination of a so-called microperforation provided in the document of value with very small diameters, for example of 100 μm. With the aid of the detector signals respectively obtained for the at least one first or second color channel, a check of the different features (window or microperforation in the example mentioned above) may then be carried out. Without the color channel-specific attenuation, the difference between the detector signals of the first feature and the detector signals of the second feature would be so great that it would exceed the dynamic range of the detector.

The color channel-specific attenuation achieves the effect that it is possible to check the first and second features, that is to say different features on the same document of value, the optical properties/absorption of which differ greatly from one another, on the basis of a single measurement process/a single image acquisition of the detector on the respective document of value.

Overall, the invention therefore enables reliable checking of documents of value provided with different features. In particular, the measurement outlay required for measuring these features is reduced.

Preferably, the first feature has a higher remittance (for detection in a reflection geometry) or higher transmittance (for detection in a transmission geometry) and/or a lower absorbance (for detection in a transmission geometry) for the electromagnetic radiation that is applied to the document of value than the second feature does. In the case of luminescent features, in particular fluorescent features, the electromagnetic radiation emitted by the first feature has a higher intensity than the electromagnetic radiation emitted by the second feature. By the above-described color channel-specific attenuation on the detector side and/or on the illumination side, it is possible to record both the first feature and the second feature in only one measurement process, while employing the detector signals thereby obtained in order to check them even when the transmittance or remittance, or the luminescence intensity, for the first feature is substantially higher (in particular by at least a factor of 10) than for the second feature.

The detector has a multiplicity of detector elements (pixels) arranged at different locations, by which the electromagnetic radiation emerging from the document of value is recorded with position resolution. The detector is in particular an image sensor (with detector pixels arranged in rows or two-dimensionally) which acquires an image or partial image of the document of value both for the first spectral range and for the second spectral range. The detector is preferably a CCD camera or CMOS camera with detector elements arranged along a row or over a two-dimensional area, which are provided with an absorbent color mask, a so-called Bayer filter or Bayer matrix, a color filter (in one of the three primary colors red (R), green (G) or blue (B)) being provided before each individual detector element. Alternatively, however, the detector may also for example be a CMOS sensor or CCD sensor in which—instead of a plurality of detector elements (pixels) lying next to one another—three sensor elements that lie above one another and are sensitive in respectively different color channels are provided in order to register color information with each picture element. This achieves recording of electromagnetic radiation emerging from the document of value that is position-resolved and spectrally resolved according to spectral ranges or color channels.

In order to carry out a transmission check or remission check of the first and second features, the radiation source is adapted to apply electromagnetic radiation to the document of value in the first and second spectral ranges.

Preferably, the radiation source is adapted to apply electromagnetic radiation in the first and second spectral ranges to the first and second features of the respective document of value, in particular the same electromagnetic radiation (the same intensity and the same spectral profile), during the checking of the respective document of value. For example, the same electromagnetic radiation is consistently applied-continuously or by means of multiplex illumination—to the document of value to be checked (while it is being transported past the sensor). This therefore obviates the need to adapt the intensity of the electromagnetic radiation (or other measurement parameters) dynamically to the feature during the checking of different features of the same document of value.

Alternatively, the radiation source may also be adapted to apply only the electromagnetic radiation of the first spectral range (but not of the second spectral range) to the first feature and to apply only the electromagnetic radiation of the second spectral range (but not of the first spectral range) to the second feature. Either this may be done dynamically while the document of value is being transported past, or, if the first and second features are arranged spaced apart perpendicularly to the transport direction of the document of value on/in the document of value, the color channel-specific attenuation may remain the same (i.e. it may take place non-dynamically) while the document of value is being transported past and be limited to the corresponding spatial region (defined perpendicularly to the transport direction) in which the first feature lies on the document of value. This may also obviate the need to adapt the intensity of the electromagnetic radiation dynamically during the checking of different features of the same document of value.

For example, the color channel-specific filter may be spatially arranged so that it color channel-specifically attenuates only the electromagnetic radiation of the (for example upper/lower) document of value portion in which the first feature lies, but not the electromagnetic radiation of the (for example lower/upper) document of value portion in which the second feature lies. Alternatively, the detector signals of the first spectral range are amplified less only in the document of value portion of the first feature but not in the document of value portion of the second feature. Alternatively, only those radiation sources that apply electromagnetic radiation of the second spectral range (but not that of the second spectral range) to the first feature are activated in the spatial region of the radiation source that corresponds to the first feature (for example in the case of LED radiation sources in the form of an LED row of spectrally different LEDs which is oriented perpendicularly to the transport direction), and only the radiation sources of the second spectral range are activated in the spatial region of the radiation source that corresponds to the second feature. In the latter region, however, both of the radiation sources may also be activated in order to apply electromagnetic radiation of the first and second spectral ranges to the second feature (a higher intensity may be achieved).

Preferably, the filter is adapted to attenuate the electromagnetic radiation in the at least one first spectral range relative to the at least one second spectral range by the same amount for substantially all detector elements (pixels). The color channel-specific attenuation is thus carried out in the same way in this case for all detector elements (pixels), so that a single spectral filter may be used therefor. This particularly straightforwardly and robustly enables checking of features having very different optical properties.

Preferably, the at least one filter is adapted to attenuate the electromagnetic radiation that emerges from the document of value or is applied to the document of value so that the intensity of the electromagnetic radiation recorded by the detector in the at least one first or second spectral range is respectively greater than a lower intensity threshold (noise) of the detector and less than an upper intensity threshold (overload, saturation) of the detector. Alternatively or in addition, the at least one radiation source may be adapted to apply the electromagnetic radiation to the document of value in such a way that the intensity of the electromagnetic radiation recorded by the detector in the at least one first or second spectral range is respectively greater than a lower intensity threshold (noise) of the detector and less than an upper intensity threshold (overload, saturation) of the detector. The two aforementioned embodiments achieve the effect, in particular, that both the electromagnetic radiation emerging from a more strongly remitting, transmitting or luminescing first feature in the at least one first channel and the electromagnetic radiation emerging from a significantly less strongly remitting, transmitting or luminescing second feature in the at least one second color channel can reliably be recorded in a single measurement process (irradiation of the document of value and recording of the electromagnetic radiation emerging from the document of value) and converted into corresponding detector signals without their being too low or unusable because of an overload of the detector in the first or second color channel.

Preferably, the first feature has a better detectability or a higher contrast in the at least one first spectral range than in the at least one second spectral range. Alternatively or in addition, the second feature has a better detectability or a higher contrast in the at least one second spectral range than in the at least one first spectral range. This preferred embodiment is based on the approach of respectively selecting and using the color channel or channels in which the relevant feature can be detected particularly well in order to check a feature, for example because in this color channel the spatial structure of the respective feature can be identified particularly well and/or is particularly rich in contrast and/or possible influences of electromagnetic radiation emerging from other features or regions of the document of value are particularly low. This ensures particularly reliable checking of different features on the document of value.

BRIEF DESCRIPTION OF THE DRAWINGS

Further advantages, features and possible applications of the present invention may be found in the following description in conjunction with the figures, in which.

DETAILED DESCRIPTION OF VARIOUS EMBODIMENTS

Figure 1:
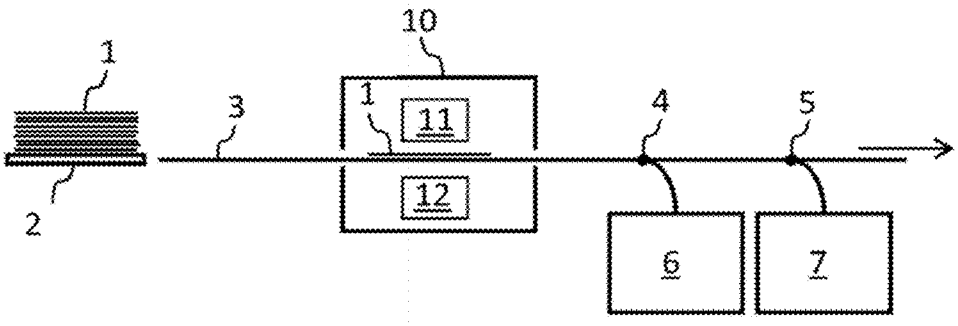
FIG. 1 shows an example of a document of value processing device.

FIG. 1 shows an example of a document of value processing device in a schematic representation. Documents of value 1, in particular bank bills, preferably in the form of a stack, are provided in a receiving instrument 2, which is also referred to as an input tray. By means of a separating instrument (not represented), the documents of value 1 are taken individually from the stack and transferred to a transport instrument 3 by which they are conveyed through the document of value processing device.

The documents of value are checked in respect of their optical properties by means of a sensor 10. For this purpose, the sensor 10 has a radiation source 11, which generates electromagnetic radiation that is applied to the respective document of value 1 to be checked. The electromagnetic radiation emerging, for example remitted, reflected, transmitted and/or emitted because of luminescence, from the document of value 1 is recorded with spatial resolution by means of a detector 12 in at least two different spectral ranges that correspond to different color channels (for example red, green and blue) of the detector 12.

In the present example, the radiation source 11 and the detector 12 are arranged in a transmission geometry in which the detector 12 records the electromagnetic radiation transmitted by the document of value 1. Depending on the way in which the radiation source 11 is arranged relative to the detector 12, there is in this case so-called bright field illumination (substantially normal angle of incidence of the radiation on the document of value 1) or so-called dark field illumination (oblique angle of incidence of the radiation on the document of value 1).

Alternatively or in addition to the transmission geometry, the radiation source 11 and the detector 12 may however also be arranged in a reflection geometry above one side of the document of value 1, in order to record the electromagnetic radiation reflected, remitted and/or emitted by the document of value 1.

Besides such an optical sensor 10, further sensors (not represented) may also be provided in order to record or check further properties of the documents of value 1.

The individual documents of value 1 are transferred into a first or second output tray 6 or 7, respectively, by means of switches 4, 5 controlled as a function of the result of the check. For example, documents of value 1 with good quality are deposited in the first output tray 6 and documents of value 1 with poor quality are deposited in the second output tray 7. Depending on the particular application, the documents of value 1 may alternatively or in addition also be deposited in the different output trays 6, 7 according to denomination or there being a suspicion of forgery. Further switches and further output trays (not represented) or further processing instruments, for instance a shredder to destroy documents of value 1 with particular properties, may also be provided, which is indicated by an arrow at the end of the transport path.

Figure 2:
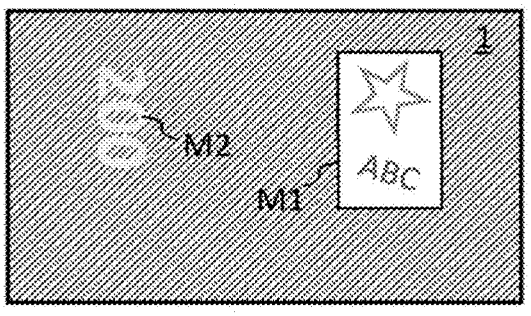
FIG. 2 shows an example of a bank bill having two different features.

FIG. 2 shows an example of a document of value 1 in the form of a bank bill having two different features. In the present example, a first feature M1 is configured as a transparent window in the form of a film integrated into the document of value 1, which is printed with motifs, symbols and/or alphanumeric characters. In a second feature M2, in the present example, the number "200" is introduced into the document of value 1 in the form of a so-called microperforation. Such a microperforation comprises a multiplicity of small holes and/or transparent locations in the document of value 1, each of which has a diameter typically between 100 and 300 μm and which together form a pattern, in the present case the number "200".

Because of the way in which they are constituted, the first feature M1 and the second feature M2 have a very different transmittance for electromagnetic radiation. Thus, bright field illumination with a relatively high intensity is necessary for detecting and checking the microperforation of the feature M2 in transmission. Conversely, a much lower illumination intensity is sufficient for detecting and checking the printed window of the feature M1 in transmission. The differences in the required intensity may be so great that they exceed the dynamic range of the detector 12 (see FIG. 1). In that case, either the second feature M2 (microperforation) would be too dark, i.e. not detectable, or the first feature M1 (window) would create an overload and therefore likewise not be detectable.

In order to enable reliable recording and checking of such features having very different optical properties, a color channel-specific attenuation of the electromagnetic radiation that is to be recorded, or is recorded, by the detector is carried out on the detector side and/or on the illumination side, as will be described in more detail below.

Figure 3:
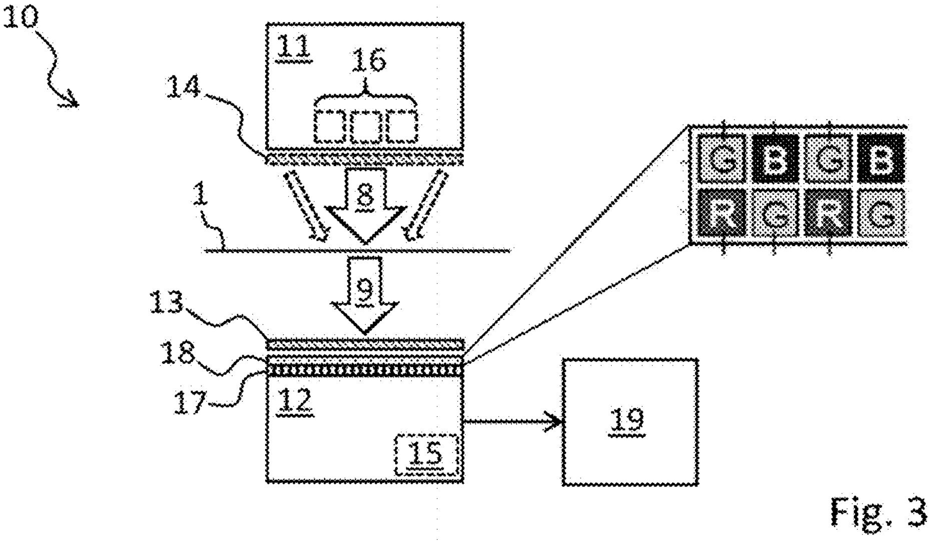
FIG. 3 shows an example of a sensor for checking documents of value.

FIG. 3 shows an example of a sensor 10 for checking documents of value 1. A radiation source 11 generates electromagnetic radiation 8, which is applied to the document of value 1 respectively to be checked. The electromagnetic radiation 8 may for example be visible (VIS), infrared (IR) and/or ultraviolet (UV) radiation.

In the case of the bright field illumination represented here, the electromagnetic radiation 8 strikes the document of value 1 substantially perpendicularly. Alternatively, dark field illumination may also be provided, in which the electromagnetic radiation 8 strikes the document of value obliquely, as indicated by the two dashed arrows.

In order to generate the electromagnetic radiation 8, the radiation source 11 may for example be configured as a white light source or have two or more light sources 16, which generate electromagnetic radiation in different spectral ranges. For example, the light sources 16 may be light-emitting diodes (LEDs) which emit electromagnetic radiation in the red, green or blue spectral range, respectively. White or at least substantially white light may likewise be obtained by mixing the electromagnetic radiation emitted by the light emitting diodes.

The electromagnetic radiation 9 transmitted by the document of value 1 is recorded by a detector 12, which in the example shown is configured as a camera that has a multiplicity of CCD-based or CMOS-based detector elements 17 arranged along a row or over an area, which are also referred to as pixels.

An absorbent color mask 18 is provided before the detector elements 17, for example in the form of a so-called Bayer filter, so that there is a color filter before each detector element 17 which is transmissive in the red (R), green (G) or blue (B) spectral range (see the enlarged plan view of a detail of the color mask 18). The detector 12 can therefore record the electromagnetic radiation 9 emerging from the document of value 1 not only with position resolution but also spectrally resolved into the three color channels (RGB).

In the present example, a color channel-specific attenuation of the electromagnetic radiation to be recorded by the detector 12 is carried out on the detector side by a spectral filter 13—in addition to the color mask 18—being provided before the detector 12, which attenuates the electromagnetic radiation 9 emerging from the document of value 1 more strongly in at least one of the color channels (R, G, B), for example red and blue, than in at least one of the other color channels, for example green.

The position-resolved detector signals obtained in the present example for the red and blue color channels are then employed in an evaluation instrument 19 to check a first feature located on the document of value 1 (see for example feature M1 in FIG. 2), which has a higher transmittance for the electromagnetic radiation 8 than a second feature located on the document of value 1 (see for example feature M2 in FIG. 2). Conversely, the detector signals obtained for the green color channel are employed in the evaluation instrument 19 to check the second feature, which has a lower transmittance for the electromagnetic radiation 8. In order to check the features, which are very different in respect of their optical properties (in the present example transmittance), the detector signals obtained for the spectrally differently intense color channels (red and blue versus green) are thus used here.

The intensity of the electromagnetic radiation 8, which is preferably applied to the entire document of value 1 and/or at least both features, is preferably selected so that the second feature with a lower transmittance mentioned in the present example can be detected well, in particular by the detector signals obtained for the green color channel being sufficiently high and in particular having a good signal-to-noise ratio.

Preferably, the spectral filter 13 is selected in respect of its filter properties so that the detector 12 is not overloaded, or does not enter the saturation range, during the recording of the electromagnetic radiation 9 transmitted by the document of value 1, at least in the red and/or blue color channel. In the present example, the spectral filter 13 must thus absorb substantially more strongly in the red or blue spectral range than in the green spectral range. The spectral filter 13 may extend over substantially all detector elements 17 of the detector 12, and in particular does not need to cover only certain pixels, that is to say in the present case the detector elements 17 intended for detecting red or blue light, which allows particularly simple generation of the color channel-specific attenuation.

The intensity of the electromagnetic radiation 8 that is applied to the document of value 1 may be kept constant spatially and/or as a function of time. For example, dynamic adaptation of the illumination intensity to the respective feature currently to be recorded on the document of value 1 being transported past the sensor 10, or multiplexed illumination of the document of value 1, in order to acquire two transmission images with a respectively different level of illumination intensity, may thereby be avoided.

Alternatively, another spectral range (for example red or blue instead of green) may also be used in order to detect the less transmissive second feature (for example the microperforation of the feature M2 in FIG. 2), which requires a high intensity. The detection of the first feature (for example the printed window of the feature M1 in FIG. 2), which requires a lower intensity, may then be carried out with the aid of the detector signals obtained for the other two spectral channels.

Preferentially, the color channels in which the relevant feature can be detected particularly well, for example since it has a high contrast in these spectral ranges, are deliberately selected in order to check the first and second feature, respectively.

In the case of the printed window of the first feature, the detection may additionally be adapted spectrally to the feature by mixing the two color channels, so as to allow even better identifiability. The neighboring (monochromatic) pixels are then converted into a color pixel (for example 2*G+R+B). Specific color filterings may be generated by adapting the color mixtures (R+G+B), i.e. spectrally specific information may be read out (for example G−0*R−0*B=green). This may be used in order to increase the contrast of a printing ink.

The evaluation instrument 19 may straightforwardly determine which feature (M1 or M2) is present, or which spectral channels are used for the detection or checking of the feature, with the aid of the detector signals by the fact that there is only one usable, sufficiently high detector signal for example of the green (G) color channel for the second feature (cf. M2: microperforation with low transmittance). In the case of the first feature (cf. M1: window with high transmittance), there are usable signals in the red (R) and blue (B) color channels, while the detector 12 is overloaded in the green color channel or the signals are at least very high and therefore cannot be used for the checking.

Alternatively or in addition to the spectral filter 13, a color channel-specific attenuation of the electromagnetic radiation recorded by the detector 12 may be carried on the detector side by adapting the amplification of the detector signals obtained for the different color channels or color pixels (for example green with higher amplification than red and blue). This may be done by an amplifier 15 which is integrated into the detector 12, or alternatively is provided separately from the detector 12. The effects and advantages described above in connection with the use of the spectral filter 13 are also achieved in this way.

Although the sensor 10 is configured as a transmission sensor in the present example, the explanations and advantages above also apply correspondingly for recording of the electromagnetic radiation reflected, remitted and/or emitted because of luminescence by the document of value 1.

Advantageously, none of the variants described above requires dynamic adaptation of the illumination intensity during the transport of the document of value. Rather, the selection of the channels and filters, or amplification, is already carried out during the adaptation of the sensor 10 to the respective documents of value, or their features, and remains constant during the document of value processing. In particular, feedback therefore does not need to be transmitted with respect to the exact position of the document of value relative to the sensor 10, and rapidly acting components are not necessary. This simplifies production and reduces the possibilities of error. Furthermore, for example, it is in this case also possible to detect features with a very different absorption or transmittance that are very close together or are located at the same position in relation to the transport direction of the document of value 1.

FIGS. 4*a* to 4*f* show a schematic representation for exemplary illustration of the recording or checking of two differently transmissive features M1 (printed window) and M2 (microperforation) by means of color channel-specific attenuation of the electromagnetic radiation recorded by the detector 12.

Figure 4A:
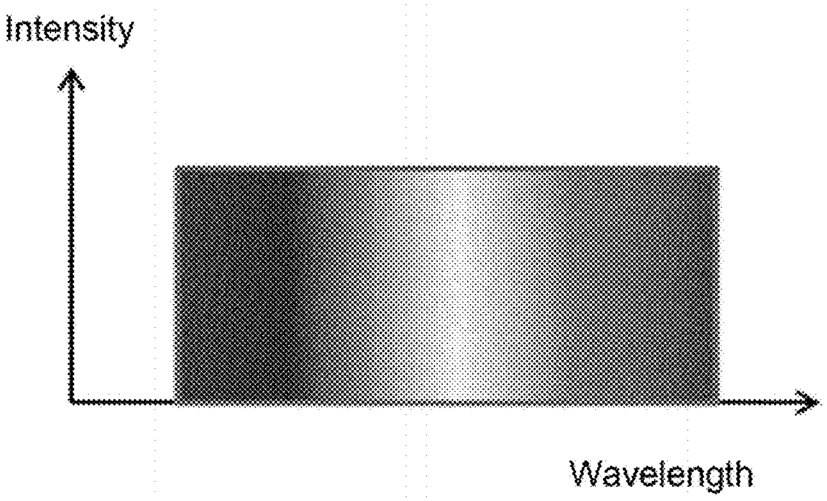
FIGS. 4*a* to 4*f* show a schematic representation to illustrate the recording, or checking, of two different features by means of a color channel-specific attenuation of the electromagnetic radiation recorded by the detector.

FIG. 4*a* shows an example of a spectral composition (intensity as a function of wavelength) of the electromagnetic radiation 8 generated by the radiation source 11 (see FIG. 3) from the blue through green to red spectral ranges.

Figure 4B:
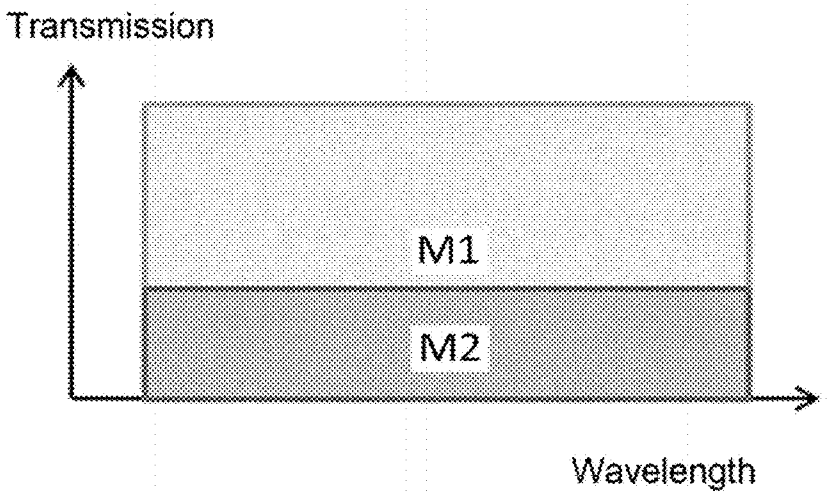

As may be seen from the example of the transmission spectra (transmission as a function of wavelength) of the features M1 and M2 as shown in FIG. 4*b*, the first feature M1 has a much higher transmittance for the electromagnetic radiation that the second feature M2 does. The different level of transmittance or intensity may be seen only schematically, i.e. not quantitatively, in FIG. 4*a-f*. It typically differs by one or more orders of magnitude.

Figure 4C:
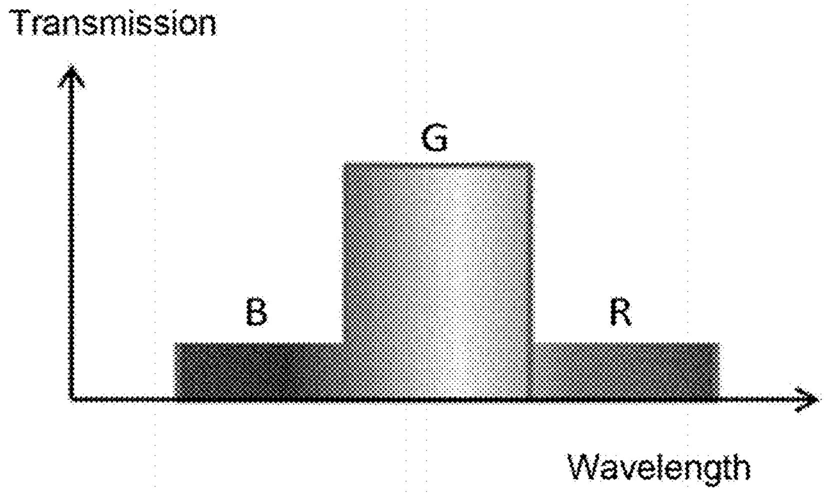

FIG. 4*c* shows an example of the transmission spectrum of the spectral filter 13, which attenuates the electromagnetic radiation in the blue and red spectral ranges (B and R, respectively) more strongly than in the green spectral range (G).

Figure 4D:
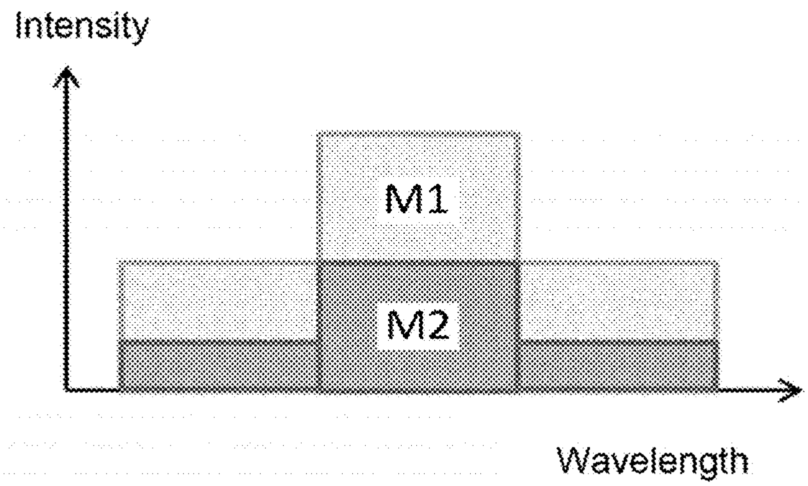

FIG. 4*d* shows an example of the spectral composition of the electromagnetic radiation recorded by the detector 12 after the electromagnetic radiation 8 emitted by the radiation source 11 has been transmitted by the first feature M1 or the second feature M2 of the document of value 1, respectively, and filtered by the spectral filter 13 according to the transmission spectrum shown in FIG. 4*c*.

Figure 4E:
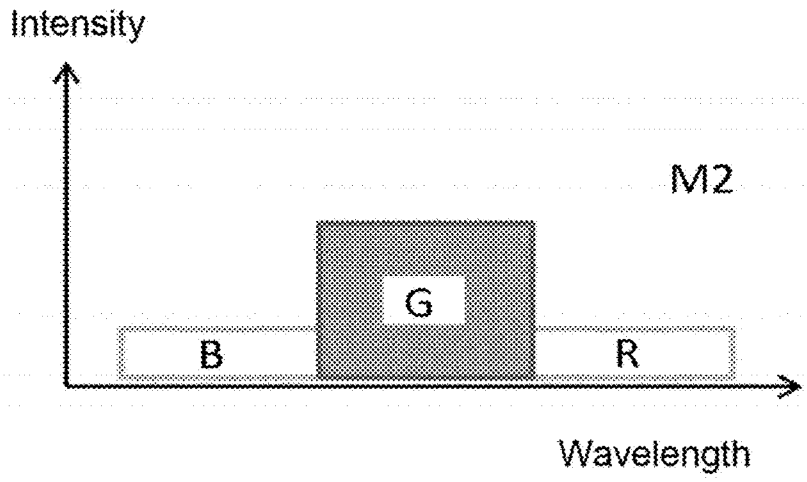

As illustrated by FIG. 4*e*, the identification or checking of the second feature M2 is based primarily on the electromagnetic radiation recorded in the green (G) color channel, since the electromagnetic radiation recorded in the blue (B) and red (R) color channels does not deliver detector signals that are sufficiently high and therefore usable. Preferably, however, the cumulative intensity of all color channels (R+G+B) is employed for the identification or checking of the second feature M2, in order to check the second feature with an even greater intensity.

Figure 4F:
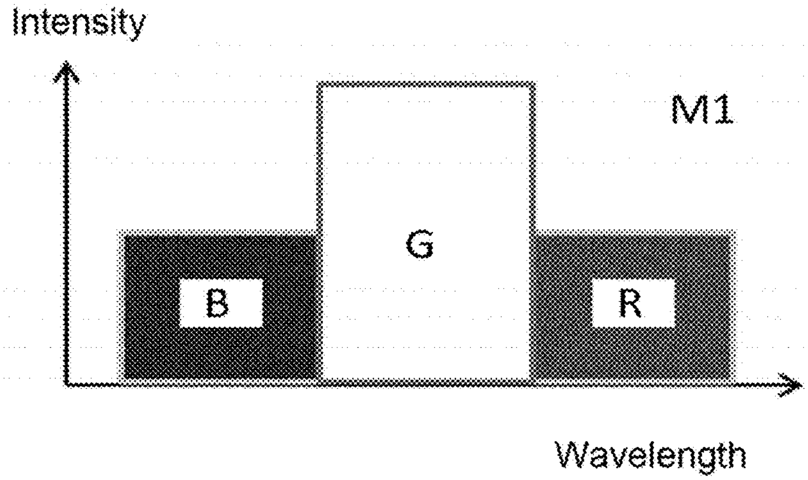

As may be seen from FIG. 4*f*, conversely, only the electromagnetic radiation recorded in the blue (B) and/or in the red (R) color channels is employed for the identification or checking of the first feature M1, while the electromagnetic radiation recorded in the green color channel (G) leads to saturation or overloading of the detector, so that its detector signals are not taken into account when checking the first feature.

In the example of the sensor 10 shown in FIG. 3, in addition or alternatively to the color channel-specific attenuation on the detector side by means of the spectral filter 13 or amplifier 15, a corresponding color channel-specific attenuation may also be provided on the side of the radiation source 11 by spectrally selectively attenuating the illumination intensity.

This may preferably be achieved by using spectrally separate light sources 16 that differ in intensity, for example LEDs for red, green and blue, which together can generate white light. By a color channel-specific attenuation of the intensity of the electromagnetic radiation emitted in the individual color channels, these allow adaptation to the different absorption behavior or different transmittances of the various features.

For example, a light source 16 (for example a green LED) for emitting green light with a higher intensity may be provided, with the aid of which the more strongly absorbing second feature M2 (microperforation) is detected, or checked. The less highly absorbing first feature M1 (window) is detected or checked with the light of less intense light sources 16 in the red and/or blue spectral illumination channels.

As an alternative to using spectrally differently emitting light sources 16, the radiation source 11 may be configured as a white light source and provided with a corresponding spectral filter 14 (dashed) which attenuates only the spectral range of the illumination in which the first feature M1 (window) that absorbs little is detected, but does not attenuate the rest of the spectral range.

The different levels of intensity of the light emitted by the spectrally separate light sources 16, or the white light source with the spectral filter 14, therefore replace or replaces the above-described spectral filter 13 before the detector 12, or the amplifier 15. The explanations above, particularly also those in respect of the technical effects and advantages, in connection with the use of the spectral filter 13 or amplifier 15 therefore also apply correspondingly for the color channel-specific attenuation of the illumination intensity.

The color channel-specific attenuation of the illumination intensity may preferably be static, i.e. a constant intensity ratio of the light sources 16 that is independent of the position of the document of value 1 to be checked is used. For example, the differently intense light sources 16 are operated simultaneously, i.e. the respective document of value is illuminated simultaneously with the light of the differently intense light sources 16, which represents a particularly simple embodiment since dynamic activation and deactivation of the light sources 16 are not necessary while checking the respective document of value.

Alternatively, however, it is also possible to configure a color channel-specific attenuation of the illumination intensity dynamically by the color channel-specific attenuation of the intensity for a wavelength, or a color channel, being dependent on the position of the feature M1, M2 on the document of value 1 relative to the detector 12, in which case a single changeover of the intensity and/or activation of particular LEDs (for example green) and deactivation of other LEDs (for example red and blue) is generally sufficient during the recording of the electromagnetic radiation emerging from the respective document of value 1.

Instead of the spectral filter 13 used in the sensor 10 shown in FIG. 3, by which electromagnetic radiation striking all detector elements 17 or color pixels of the detector 12 is attenuated in the same way (for example a color filter absorbing red and blue), it is possible to use a "checkerboard-like" so-called neutral density filter which causes strong attenuation only before the detector elements 17 or pixels of a particular color channel (for example red and blue) (pixels for detecting the first feature M1, or window) and causes no attenuation or only little attenuation before other pixels (pixels for detecting the second feature M2, or microperforation). The explanations above, particularly also those in respect of the technical effects and advantages, in connection with the use of the spectral filter 13 or amplifier 15 therefore also apply correspondingly for the use of a neutral density filter.

The invention claimed is:

1. A sensor for checking documents of value comprising:

at least one radiation source, which is adapted to apply electromagnetic radiation to a document of value, and a detector having a multiplicity of detector elements arranged at different locations, which is adapted to record electromagnetic radiation emerging from the document of value in at least two different spectral ranges with position resolution, while generating for each of the spectral ranges a detector signal corresponding to an intensity of the recorded electromagnetic radiation in the respective spectral range, and an evaluation instrument, wherein the evaluation instrument is programmed to check a first feature provided on or in the document of value with the aid of the detector signals generated for at least one first spectral range, and to check a second feature provided on or in the document of value, while taking into account the detector signals generated for at least one second spectral range, and wherein the sensor is configured to provide a color channel-specific attenuation in the first spectral range relative to the second spectral range, and wherein the first feature is a window integrated into the document of value that is covered with a film, and wherein the evaluation instrument is configured to examine the window on a basis of the detector signal corresponding to the intensity of the recorded electromagnetic radiation in the first spectral range.

2. The sensor according to claim 1, wherein the sensor has at least one color channel-specific filter for the color channel-specific attenuation, which is arranged between the detector and the document of value and/or between the radiation source and the document of value, and which is adapted to attenuate the electromagnetic radiation that emerges from the document of value or is applied to the document of value in the at least one first spectral range relative to the at least one second spectral range by at least a factor of 5.

3. The sensor according to claim 2, wherein the filter is adapted to attenuate the electromagnetic radiation in the at least one first spectral range relative to the at least one second spectral range by a same amount for substantially all detector elements.

4. The sensor according to claim 2, wherein the at least one filter is adapted to attenuate the electromagnetic radiation that emerges from the document of value or is applied to the document of value so that the intensity of the electromagnetic radiation recorded by the detector in the at least one first or second spectral range is respectively greater than a lower intensity threshold of the detector and less than an upper intensity threshold of the detector.

5. The sensor according to claim 1, wherein the sensor has at least one color channel-specific amplifier for the color channel-specific attenuation, which is adapted to amplify the detector signals generated for the different spectral ranges, an amplification of the detector signals generated for the at least one first spectral range being less by at least a factor of 5, than the amplification of the detector signals generated for the at least one second spectral range.

6. The sensor according to claim 1, wherein the at least one radiation source is/are suitable for applying electromagnetic radiation of the first and second spectral ranges to the document of value, and the color channel-specific attenuation is carried out by the at least one radiation source, in which the at least one radiation source is/are operated so that its/their emission intensity in the at least one first spectral range is less by at least a factor of 5, than in the at least one second spectral range.

7. The sensor according to claim 1, wherein the first feature has a higher remission or transmission and/or lower absorption for the electromagnetic radiation that is applied to the document of value than the second feature does.

8. The sensor according to claim 1, wherein the at least one radiation source is adapted to apply the electromagnetic radiation to the document of value in such a way that the intensity of the electromagnetic radiation recorded by the detector in the at least one first or second spectral range is respectively greater than a lower intensity threshold of the detector and less than an upper intensity threshold of the detector.

9. A sensor system having the sensor according to claim 1 and a document of value comprising:

at least one first feature, including an authenticity or security feature, which is adapted to deliver electromagnetic radiation, and at least one second feature, including an authenticity or security feature, which is adapted to deliver electromagnetic radiation, wherein the first feature has a higher remission or transmission and/or lower absorption for the electromagnetic radiation that is applied to the document of value than the second feature does.

10. The sensor system according to claim 9, wherein the first feature has a better detectability/higher contrast in the at least one first spectral range than in the at least one second spectral range, and/or the second feature has a better detectability/higher contrast in the at least one second spectral range than in the at least one first spectral range.

11. A document of value processing device having the sensor according to claim 1 and a conveyer which is adapted to convey documents of value.

12. The sensor according to claim 1, wherein the second feature is a microperforation comprising a plurality of holes and/or transparent locations, and wherein the evaluation instrument is configured to examine the microperforation on a basis of the detector signal corresponding to the intensity of the recorded electromagnetic radiation in the second spectral range.

13. The sensor according to claim 1, wherein the color channel-specific attenuation in the first spectral range relative to the second spectral range is a color channel-specific attenuation of the electromagnetic radiation shined onto the document of value, a color channel-specific attenuation of the electromagnetic radiation to be recorded by the detector, or a color channel-specific attenuation of the detector signals of the detector.

14. A method for checking documents of value wherein:

at least one radiation source generates electromagnetic radiation, which is applied to a document of value, and a detector, which has a multiplicity of detector elements arranged at different locations, records electromagnetic radiation emerging from the document of value in at least two different spectral ranges with position resolution, while generating for each of the spectral ranges a detector signal corresponding to an intensity of the recorded electromagnetic radiation in the respective spectral range, wherein a first feature provided on or in the document of value is checked with the aid of the detector signals generated for the at least one first spectral range, a second feature provided on or in the document of value is checked while taking into account the detector signals generated for the at least one second spectral range, and a color channel-specific attenuation is set up in the first spectral range relative to the second spectral range, and wherein the first feature is a window integrated into the document of value that is covered with a film, and wherein an evaluation instrument examines the window on a basis of the detector signal corresponding to the intensity of the recorded electromagnetic radiation in the first spectral range.

15. The method according to claim 14, wherein the color channel-specific attenuation is carried out by at least one color channel-specific filter, which is arranged between the detector and the document of value and/or between the radiation source and the document of value, and which attenuates the electromagnetic radiation that emerges from the document of value or is applied to the document of value in the at least one first spectral range relative to the at least one second spectral range by at least a factor of 5.

16. The method according to claim 14, wherein the color channel-specific attenuation is carried out by at least one-color channel-selective amplifier, which amplifies the detector signals generated for the different spectral ranges, an amplification of the detector signals generated for the at least one first spectral range being less by at least a factor of 5, than the amplification of the detector signals generated for the at least one second spectral range.

17. The method according to claim 14, wherein the at least one radiation source is/are suitable for applying electromagnetic radiation of the first and second spectral ranges to the document of value, and the color channel-specific attenuation is carried out by color channel-specific attenuation of the at least one radiation source, in which the at least one radiation source is/are operated so that its/their intensity in the at least one first spectral range is less by at least a factor of 5, than in the at least one second spectral range.

18. The method according to claim 14, wherein the second feature is a microperforation comprising a plurality of holes and/or transparent locations, and wherein the evaluation instrument is configured to examine the microperforation on a basis of the detector signal corresponding to the intensity of the recorded electromagnetic radiation in the second spectral range.

19. The method according to claim 14, wherein the color channel-specific attenuation in the first spectral range relative to the second spectral range is a color channel-specific attenuation of the electromagnetic radiation shined onto the document of value, a color channel-specific attenuation of the electromagnetic radiation to be recorded by the detector, or a color channel-specific attenuation of the detector signals of the detector.

* * * * *